Dec. 11, 1962 G. KLIESCH 3,068,391
RECTIFIER PLANT WITH MONOCRYSTALLINE SEMICONDUCTOR CELLS
Filed Dec. 18, 1959 2 Sheets-Sheet 1
FIG. 1
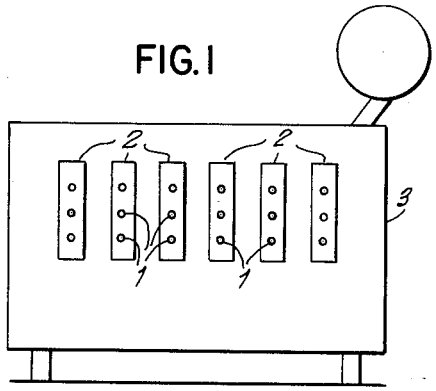
FIG. 2
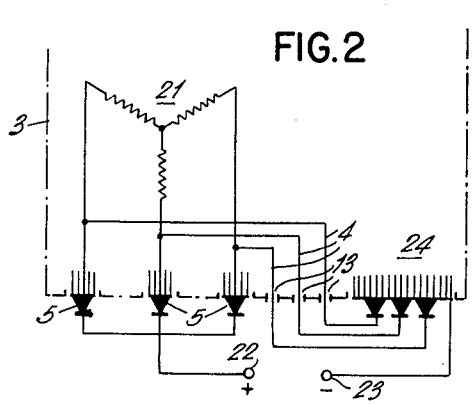
FIG. 3
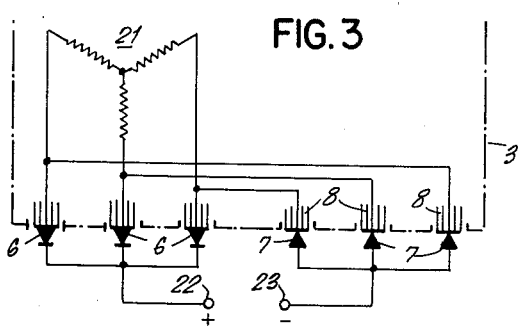
FIG. 3a
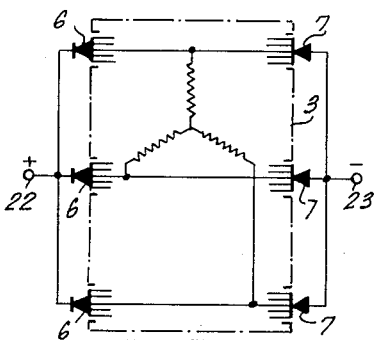
FIG. 4
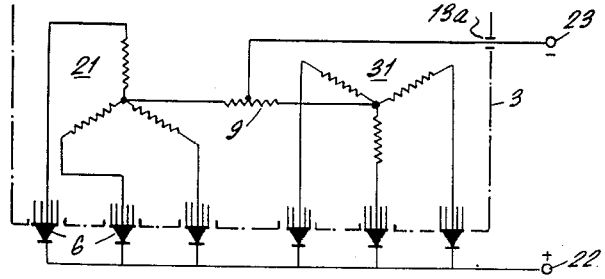
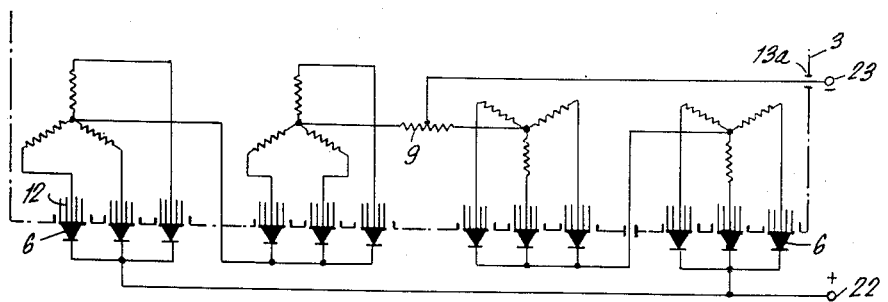
FIG. 7

Dec. 11, 1962        G. KLIESCH        3,068,391
RECTIFIER PLANT WITH MONOCRYSTALLINE SEMICONDUCTOR CELLS
Filed Dec. 18, 1959        2 Sheets-Sheet 2
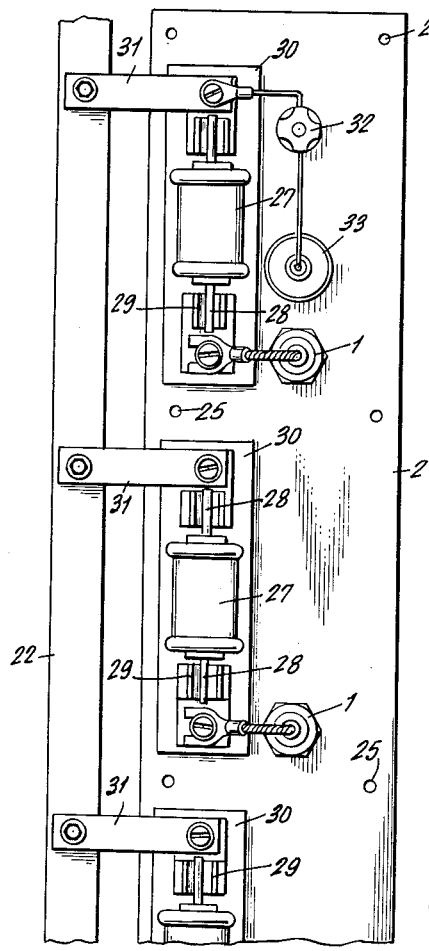
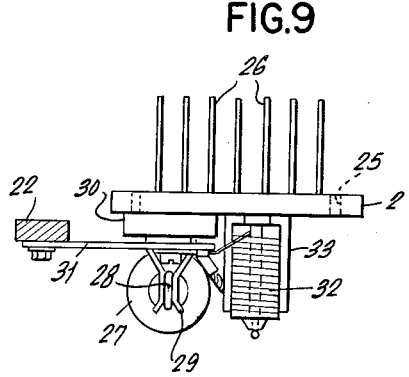
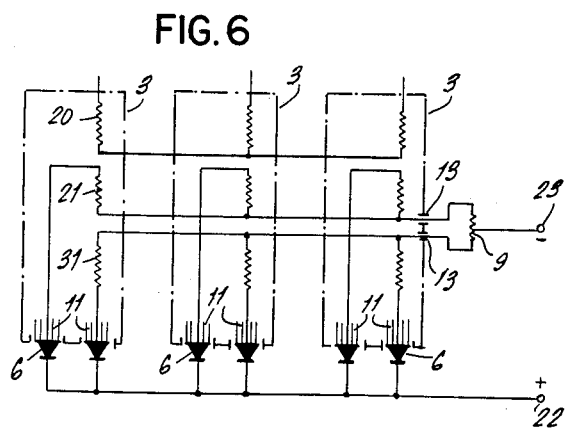
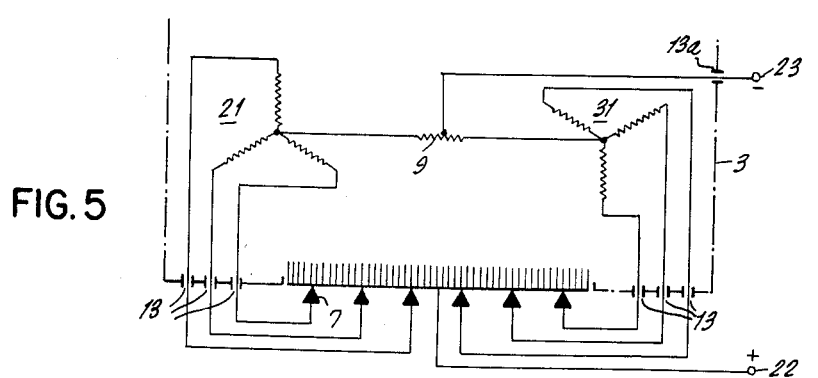

United States Patent Office 3,068,391
Patented Dec. 11, 1962

3,068,391
RECTIFIER PLANT WITH MONOCRYSTALLINE SEMICONDUCTOR CELLS
Günter Kliesch, Erlangen, Germany, assignor to Siemens-Schuckertwerke Aktiengesellschaft, Berlin-Siemensstadt, Germany, a corporation of Germany
Filed Dec. 18, 1959, Ser. No. 860,461
Claims priority, application Germany Dec. 19, 1958
5 Claims. (Cl. 321—8)

My invention relates to rectifier plants for supplying very high currents at relatively low voltages such as required, for example, in electrochemical processes.

For good efficiency of such high-current rectifier plants, it is desirable to keep the inductive and ohmic resistances within the rectifier assembly as small as possible. Practically, the length of the direct-current power buses is fixed because it is determined by the construction and design of the particular current-consuming plant. However, a possibility of modification is avoidable as regards the length and resistance of the alternating-current three-phase connections within the rectifier assembly itself as small as possible.

The desirability of smallest feasible conductor lengths will be illustrated by the following numerical examples. Disregarding any increase in conductor cross section as may be required by current crowding at extremely high amperages, the cross section of the three-phase bus bars in a Y-connected rectifier assembly with throttling reactor is 1.73 times as large as the cross section of one of its direct-current buses. With a rectifier bridge connection, the necessary cross section of the alternating-current buses increases up to 2.45 times that of the direct-current bus; and up to 3.46 times the direct-current bus cross-section is required if the bridge network is connected with a power transformer through magnetically saturable reactors for voltage control of the rectified output. The greater cross section required for the alternating-current buses corresponds to a correspondingly greater weight of copper.

Relative to selenium rectifiers the problem of minimizing the length of the alternating-current connections has heretofore been coped with by mounting and operating these rectifiers within the tank and immersed in the insulating oil of the transformer. Placing the rectifier elements at such inaccessible locations is sometimes permissible because selenium rectifiers are self-healing; that is, they retain at least their blocking action in the event of defects.

However, there is an increasing demand for monocrystalline rectifier elements on the basis of germanium and silicon because, for given operating requirements, these types of semiconductor elements occupy less space and have a better efficiency. In contrast to the above-mentioned selenium rectifiers, however, the novel semiconductor cells form short circuits when defective. This makes it impracticable to operate such rectifier cells under oil or within the interior of the transformer tank because this makes it extremely difficult to exchange defective components.

It is, therefore, an object of my invention to devise a rectifier plant with monocrystal semiconductor rectifier cells that combines the advantage of easy exchangeability of the individual rectifier cells with shortest possible length of the conductors connecting these cells with each other and with the windings of the power transformer.

To this end, and in accordance with a feature of my invention, the wall of the coolant-filled housing of the power transformer to which the rectifier cells are connected is provided with openings, preferably at locations below the liquid level in the housing, and the monocrystal semiconductor cells are inserted in these openings, either directly or preferably by means of a carrier plate common to a group of such cells, so that the cells or carrier plates form a tight seal. The mounting, according to another feature of my invention, is preferably such that the cooling vanes with which such rectifier cells are usually equipped, enter through the openings into the interior of the transformer housing where they are immersed in the coolant.

The invention will be further understood from the embodiments described in the following with reference to the drawings, in which—

FIG. 1 is a front view of a transformer with carrier plates on which rectifier elements are mounted.

FIG. 2 is a circuit diagram of a rectifier according to FIG. 1.

FIGS. 3, 3a and 4 to 7 illustrate six further circuit diagrams of such rectifiers.

FIG. 8 is a front view and FIG. 9 a top view of an insert assembly for rectifiers according to FIGS. 1 to 7.

The rectifier shown in FIG. 1 comprises a power transformer mounted in a sheet-metal housing 3 filled with coolant, for example oil. The transformer, as well as the rectifier cells mentioned below, are rated for supplying rectified power to electrochemical or other high-current consuming equipment. The individual rectifier cells 1 are mounted in groups on a number of carrier plates 2 which are secured to the wall of housing 3 so as to cover and tightly seal the openings. The individual rectifier cells are provided with rearward cooling vanes or ribs which protrude into the interior of the housing 3 so as to be immersed in the coolant. The rectifier cells are preferably fastened to the carrier plates 2 by means of screw bolts screwed into blind bores of the insert plates 2. This permits exchanging the individual rectifier cells without opening the transformer tank.

According to the circuit diagram shown in FIG. 2, the individual rectifier cells are electrically connected between the secondary winding 21 of the power transformer located in the housing 3 and are also connected with the direct-current output buses schematically shown at 22 and 23. In the illustrated example, the minus pole or negative bus 23 is directly connected with the metal housing 3. This requires that the branch lines 4 which connect the transformer secondary windings with one of the cell groups 24, pass from within the housing 3 to the outside through insulating and sealed bushings 13 of the housing wall. The rectifier cells connected with the positive bus 22 are mounted, for each phase, on a separate carrier plate 5 which is inserted into the housing wall 3 and is insulated therefrom. In FIG. 2, as well as in FIGS. 3 to 7, the housing 3 is schematically illustrated by a dot-and-dash line, and the primary windings of the power transformer are omitted.

FIG. 3 illustrates another simple bridge-type connection which differs from that of FIG. 2 in that rectifier cells of mutually opposed forward conductance are used in the two respective branches of each phase. This has the advantage that the connecting leads coming from the branch points of the transformer secondary circuit, extend to the rectifier cells 6 and 7 entirely within the transformer tank so that no sealed bushings in the tank wall are needed. This requires mounting the rectifier cells 7 at the negative side of the output circuit on individual insert plates, mutually separated as to phases and in mutually insulated relation to each other. The carrier plates are mounted on the tank wall so as to cover and seal the openings as explained in the foregoing. In FIG. 3, as well as in FIGS. 3a to 7, the positive and negative power output buses are denoted by 22 and 23 respectively, as in FIG. 2.

The rectifier cells need not all be mounted or inserted in a single wall of the transformer tank but may also be located on two or more tank walls. Thus, FIG. 3a illustrates an embodiment in which the cells 6, 7 of a bridge network are mounted on three walls of the tank 3. In electrical respects the rectifier of FIG. 3a is fully equivalent to that of FIG. 3 but is preferable with respect to layout and spacial arrangement of the direct-current buses for some applications and particularities of the installation locality.

FIG. 4 shows schematically a conventional double-Y network applied in conjunction with the invention and comprising two sets of three-phase transformer secondary windings 21, 31 whose respective star points are interconnected by a mid-tapped inductive balancing reactor 9. Each group of rectifier cells 6 connected in one of the six respective phases is mounted on its own carrier plate which is inserted into the tank wall and insulated therefrom.

A similar network but comprising rectifier cells reversely poled forward conductance is illustrated in FIG. 5. This particular embodiment has the advantage that all rectifier cells 7 are fastened to a common insert 10. This affords conductively connecting the insert plate, which represents the positive direct-current pole of the rectifier plant, with the tank wall 3 while passing the negative lead from bus 23 through an insulating bushing 13a as shown. If desired, however, the negative pole may be conductively connected with the tank, the inserted carrier plate then being insulated from the tank. It will be noted that in embodiments of this type a total of six phase conductors, extending from the transformer secondaries to the rectifier cells, must pass through insulated sealing bushings 13 in the tank wall.

FIG. 6 shows the circuit diagram of a rectifier plant designed for a particularly high power output. Each individual phase of the three-phase secondary circuit is accommodated in a separate oil-filled housing 3 and comprises a primary winding 20 and two secondary windings 21, 31 on a single transformer core. In this particular embodiment, a balancing reactor 9 is connected between the negative output bus 23 and the two groups of secondary windings 21 and 31 as in the embodiments of FIGS. 4 and 5. Each individual phase transformer is provided with two cell-carrying insert plates 11 which are insulated from the tank 3.

FIG. 7 illustrates a double-Y network with a balancing reactor 9 for providing an increased rectified output voltage. Each side comprises two sets of three-phase transformer secondaries as well as six rectifier cells or groups of cells for the respective six phases, thus requiring a total of twelve insert plates 12 which are insulated from the transformer tank 3 and mounted to cover and seal the openings in the tank wall as described above.

While the illustrated and above-described rectifier networks illustrate various possibilities of modification, it will be understood that, in principle, all other transformer-rectifier connections known for other types of rectifiers are also applicable for the purposes of the invention.

Further modifications result from poling a number of the rectifier cells for forward conductance from the interior of the transformer tank to the outside, and poling another number of the rectifiers for forward conductance in the direction from the outside to the interior of the tank.

Semiconductor rectifiers of the type here involved are usually provided with auxiliary capacitors or RC members connected in parallel to the respective rectifier cells for preventing excessive voltage peaks. Such auxiliary damping components are preferably mounted on, or combined with, the insert plates carrying the cells. It is often of advantage to also connect with the insert plates the protective devices usually required in high current rectifier plants, for example rapidly responsive low-voltage fuses or protective short-circuiting switches. Such protective devices may also be mounted on the transformer housing in the immediate vicinity of the corresponding insert plates, either on the outside or inside of the tank.

The above-mentioned combination of auxiliary damping components and protective devices with the cell-carrying insert plates of a rectifier according to the invention is exemplified by the insert assembly illustrated in FIGS. 8 and 9 and applicable with any of the above-described rectifier plants.

The partially illustrated insert plate 2 according to FIGS. 8 and 9 consists of conducting metal and carries a number of individual semi-conductor rectifier cells 1 connected in any of the rectifying networks described above. The plate 2 is mounted on the tank wall of the transformer by means of bolts passing through respective bores 25. The plate covers and seals the wall opening and may be insulated from the tank wall if required. The rear side of the insert plate 2 is provided with cooling vanes 26 which are integral with the plate and extend over most of the vertical length of the plate. The vanes are immersed in the oil or other coolant of the transformer when the plates are mounted on the tank.

Mounted on the front of the insert plate are protective devices which, in the illustrated example, consist of rapidly acting fuses 27 connected in series with the respective rectifier cells. The fuses 27 are of the totally enclosed type. Each has two knife contacts 28 removably held in lyre-type contact clamps 29 which are fastened on an insulating plate 30 rigidly secured to the metal plate 2. The parallel connection of the rectifier cells and fuses is effected by means of respective connector links 31 all joined with a common bus bar 22 to which the load circuit of the rectifier plant is connected as explained above with reference to FIGS. 2 through 7.

The rectifier cells on insert plate 2 are further provided with damping means for protecting the cells from excessively high voltage peaks. It suffices to use a single device of this type for all rectifier cells connected electrically in parallel on one and the same insert plate. In the illustrated embodiment, the damping device consists of an ohmic resistor 32 in series with a capacitor 33. The resistor has one end attached to one of the connector links 31 and the other end attached to one pole of the capacitor 33 whose other pole is formed by the metal can of the capacitor which is fastened to the insert plate 2 and thus in conducting contact therewith.

It will be obvious to those skilled in the art upon studying this disclosure that the invention is amenable to various modifications other than particularly illustrated and described herein, without departing from the essential features of my invention and within the scope of the claims annexted hereto.

I claim:

1. A rectifier plant, particularly for power supply to electrochemical and other high-current consuming equipment, comprising a transformer having a coolant-containing housing, a number of monocrystal semiconductor rectifier cells to provide rectified output current from said transformer, said housing having a wall with openings beneath the liquid level of the coolant, carrier plates covering said respective openings on the exterior side of said wall and in sealed connection with said wall, said carrier plates having cooling vanes extending into said housing to be submerged in the coolant, said cells being threadably mounted on said plates in the borings and having respective surfaces intimately contacting said plates at the exterior side thereof, and conductor means extending from the interior of the housing to said cells for electrically connecting said transformer and said cells with a minimal lead length.

2. A rectifier plant, particularly for power supply to electrochemical and other high-current consuming equipment, comprising a transformer having a coolant-containing housing, a number of monocrystal semiconductor rectifier cells to provide rectified output current from said transformer, said housing having a plurality of upright walls each provided with a number of openings beneath the liquid level of the coolant in said housing, carrier structures covering and sealing said respective openings and mounted on the exterior side of said respective walls, said carrier structures having respective groups of cooling vanes extending into said housing to be submerged in the coolant, said carrier structures having screw borings at the external side thereof, a group of said cells being threaded into the borings, said cells having contact surfaces transverse to the borings and contacting said plates on each of said carrier plates on the exterior side thereof, and conductor means extending from the interior of the housing to said cells for electrically connecting said transformer and said cells with a minimal lead length.

3. A rectifier plant for power supply to high-current consuming equipment, comprising a transformer having a coolant-containing housing, a number of monocrystal semiconductor rectifier cells to provide rectified output current from said transformer, said housing having a wall with openings located beneath the coolant level, a plurality of carrier plates each having blind screw borings, said cells having bolts engaging said screw borings so as to mount said cells on said plates, said cells having engagement surfaces transverse to said bolts and contacting said plates, said screw bolts forcing said surfaces into intimate engagement with said plates, said cells having cooling vanes protruding from the rear of said plates into the coolant space of said housing, said plates covering said respective openings and being mounted on the exterior side of said wall in sealed relation thereto, and conductor means extending from the interior of the housing to said cells for electrically connecting said transformer and said cells with a minimal lead length.

4. A rectifier plant according to claim 3, comprising respective protective cut-out devices electrically connected in series with each of said respective cells, and voltage limiting impedance means electrically connected in parallel with all of said cells on each of said carrier plates, said devices and said impedance means being mounted on said plate.

5. A rectifier plant, particularly for power supply to electrochemical and other high-current consuming equipment, comprising a transformer having a coolant-containing housing, a plurality of monocrystal semiconductor rectifier cells to provide rectifier output current from said transformer, said housing having a wall with openings below the coolant level, plate means mounting said cells in said openings on the exterior side of said wall and in sealed connection therewith, and conductor means extending from the interior of the housing directly to said cells for electrically connecting said transformer and said cells with a minimal lead length, said plate means and said cells having mating threaded means and respective engaging surfaces forced into intimate contact by said threaded means.

References Cited in the file of this patent
UNITED STATES PATENTS

| | | |
|---|---|---|
| 1,874,478 | Fayer | Aug. 30, 1932 |
| 2,751,528 | Burton | June 19, 1956 |
| 2,756,368 | Gross et al. | July 24, 1956 |
| 2,780,757 | Thornhill et al. | Feb. 5, 1957 |
| 2,895,100 | Filberich et al. | July 14, 1959 |
| 2,942,165 | Jackson et al. | June 21, 1960 |